(12) United States Patent
Kundargi et al.

(10) Patent No.: US 11,595,109 B2
(45) Date of Patent: Feb. 28, 2023

(54) CELLULAR SYSTEM UTILIZING BEAM COHERENCE INTERVAL METRIC

(71) Applicant: National Instruments Corporation, Austin, TX (US)

(72) Inventors: Nikhil U. Kundargi, Austin, TX (US); Venkata Siva Santosh Ganji, Bryan, TX (US); Ahsan Aziz, Austin, TX (US); James Wesley McCoy, Leander, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 17/741,188

(22) Filed: May 10, 2022

(65) Prior Publication Data

US 2022/0376764 A1 Nov. 24, 2022

Related U.S. Application Data

(62) Division of application No. 16/600,495, filed on Oct. 12, 2019, now Pat. No. 11,381,297.

(51) Int. Cl.
*H04B 7/06* (2006.01)
*H04W 16/28* (2009.01)
(Continued)

(52) U.S. Cl.
CPC ......... *H04B 7/0695* (2013.01); *H04B 7/0617* (2013.01); *H04B 17/318* (2015.01);
(Continued)

(58) Field of Classification Search
CPC .............. H04W 16/28–32; H04W 88/00–06
See application file for complete search history.

(56) References Cited

U.S. PATENT DOCUMENTS

2004/0266434 A1* 12/2004 Lehtinen ......... H04W 36/00837
455/450
2013/0155847 A1* 6/2013 Li .................... H04W 24/04
370/225
(Continued)

OTHER PUBLICATIONS

"Sidelink Enhancement for Rel.17." AT&T. 3GPP TSG RAN WG #85. New Port Beach, CA. Sep. 16-20, 2019. RP-192110. pp. 1-8.
(Continued)

*Primary Examiner* — San Htun
(74) *Attorney, Agent, or Firm* — E. Alan Davis; Huffman Law Group, PC (57) ABSTRACT

A user equipment device (UE) determines a beam coherence interval metric, which is a measure of stability of a beam pair over time based on a set of beam coherence intervals measured by the UE. The beam pair comprises a receive beam of the UE and a transmit beam of a base station transmitting to the UE. A beam coherence interval comprises a time duration within which a quality of a signal received on the UE receive beam remains within one of a plurality of signal quality bins. The UE also determines a hysteresis value based on the beam coherence interval metric and uses the hysteresis value to decide to switch from an active receive beam to a different receive beam that has a signal quality higher than the active receive beam by at least the hysteresis value. Alternatively, the base station determines and sends the UE the hysteresis value.

24 Claims, 5 Drawing Sheets

(51) Int. Cl.
   *H04W 72/04* (2023.01)
   *H04B 17/318* (2015.01)
   *H04W 24/10* (2009.01)
   *H04B 17/336* (2015.01)
   *H04W 80/02* (2009.01)

(52) U.S. Cl.
   CPC .......... *H04B 17/336* (2015.01); *H04W 16/28* (2013.01); *H04W 24/10* (2013.01); *H04W 72/0413* (2013.01); *H04W 80/02* (2013.01)

(56) References Cited

U.S. PATENT DOCUMENTS

| | | | |
|---|---|---|---|
| 2014/0185481 A1* | 7/2014 | Seol | H04W 52/24 |
| | | | 370/252 |
| 2016/0119910 A1* | 4/2016 | Krzymien | H04B 7/0639 |
| | | | 370/329 |
| 2017/0207845 A1 | 7/2017 | Moon et al. | |
| 2017/0214444 A1* | 7/2017 | Nigam | H04B 7/063 |
| 2019/0245605 A1 | 8/2019 | Islam et al. | |
| 2020/0244413 A1 | 7/2020 | Takeda et al. | |
| 2020/0245348 A1 | 7/2020 | Chen et al. | |

OTHER PUBLICATIONS

"Enhancements on Multi Beam Operation." AT&T. 35PP TSG RAN WG1 #98. Prague, CZ. Aug. 26-30, 2019. R1-1909076. pp. 1-4.

Satchidanandan, Bharadwaj et al. "Iris: A Directional MAC Protocol with Applications to Millimeter-Wave Mobile Ad-Hoc Networks." 2019 11$^{th}$ International Conference on Communication Systems & Networks (COMSNET). ©2019 IEEE. pp. 1-17.

Satchidanandan, Bharadwaj et al. "TrackMAC: An IEEE 802.1 1 ad-Compatible Beam Tracking-Based MAC Protocol for 5G Millimeter-Wave Local Area Networks." 2018 10$^{th}$ International Conference on Communication Systems & Networks (COMSNETS). ©2018 IEEE. pp. 175-182.

* cited by examiner

| TIME SLOT (5 ms) | POWER (dBm) | POWER BIN | BEAM COHERENCE INTERVALS LENGTH | INDEX |
|---|---|---|---|---|
| 1 | 33 | 30-40 | 3 | } T0 |
| 2 | 36 | 30-40 | | |
| 3 | 38 | 30-40 | | |
| 4 | 42 | 40-50 | 1 | T1 |
| 5 | 50 | 50-60 | 4 | } T2 |
| 6 | 52 | 50-60 | | |
| 7 | 56 | 50-60 | | |
| 8 | 58 | 50-60 | | |
| 9 | 63 | 60-70 | 3 | } T3 |
| 10 | 69 | 60-70 | | |
| 11 | 64 | 60-70 | | |
| 12 | 51 | 50-60 | 1 | T4 |
| 13 | 46 | 40-50 | 6 | } T5 |
| 14 | 43 | 40-50 | | |
| 15 | 43 | 40-50 | | |
| 16 | 42 | 40-50 | | |
| 17 | 41 | 40-50 | | |
| 18 | 40 | 40-50 | | |
| 19 | 38 | 30-40 | 5 | } T6 |
| 20 | 35 | 30-40 | | |
| 21 | 33 | 30-40 | | |
| 22 | 36 | 30-40 | | |
| 23 | 38 | 30-40 | | |
| 24 | 42 | 40-50 | 1 | T7 |
| 25 | 50 | 50-60 | 4 | } T8 |
| 26 | 52 | 50-60 | | |
| 27 | 56 | 50-60 | | |
| 28 | 58 | 50-60 | | |
| 29 | 63 | 60-70 | 3 | } T9 |
| 30 | 69 | 60-70 | | |
| 31 | 64 | 60-70 | | |
| 32 | 51 | 50-60 | 1 | T10 |
| 33 | 46 | 40-50 | 6 | } T11 |
| 34 | 43 | 40-50 | | |
| 35 | 43 | 40-50 | | |
| 36 | 42 | 40-50 | | |
| 37 | 41 | 40-50 | | |
| 38 | 40 | 40-50 | | |
| 39 | 38 | 30-40 | 2 | } T12 |
| 40 | 35 | 30-40 | | |

FIG. 5

BEAM COHERENCE INTERVAL METRICS
NORMALIZED HISTOGRAM MEAN = 2.8846
NORMALIZED HISTOGRAM MEDIAN = 2.5
NORMALIZED HISTOGRAM VARIANCE = 0.991124
NORMALIZED HISTOGRAM STANDARD DEVIATION = 0.995552
POWER-WEIGHTED MEAN = 2.9016

CELLULAR SYSTEM UTILIZING BEAM COHERENCE INTERVAL METRIC

CROSS REFERENCE TO RELATED APPLICATION(S)

This application is a divisional of U.S. Non-Provisional application Ser. No. 16/600,495, filed Oct. 12, 2019, which is hereby incorporated by reference in its entirety.

BACKGROUND

The 5G (5$^{th}$ generation) mobile telecommunications system is able to span a wide variety of deployment scenarios (e.g., Rural, Urban Macro, Dense Urban, Indoor, etc.) in a flexible and scalable manner. In particular, TDD (time division duplex) air interfaces such as New Radio (NR) allow for symbol-level switching and potential configurability that in turn allow for features to support three primary aspects of 5G air interfaces, namely enhanced Mobile BroadBand (eMBB), massive Machine Type Communications (mMTC) and Ultra-Reliable and Low Latency Communications (URLLC). The air interfaces may support extremely high frequencies, including in the millimeter wave (mmWave) spectrum.

The propagation characteristics of mmWave signals are such that the base station (e.g., gNB) and the mobile device both need to employ beamforming using phased array antenna panels to accomplish sufficient coverage. Unlike traditional cellular systems, many handoffs, or switches, will be performed even within a cell, only these handoffs are between beams. Herein lies a difference between 4G cellular and 5G mmWave communications: beam management. Beam management is a method for handling intracell and intercell beam handoffs. It is expected that the base station will support more than 64 beams and the mobile device up to 128 beams per phased array antenna panel, for example.

Efficient handling of handoffs between beams is important because useful communications beams have a finite lifetime. For example, under rotational channels, such as a person turning, there may be a need for frequent beam handoffs, whereas when the channel is relatively static, beam handoffs may be very infrequently needed.

BRIEF SUMMARY

Embodiments are described of a closed loop active control system that incorporates beam coherence interval metric determination by the UE (optionally according to parameters provided by the base station), provision of the beam coherence interval metric to the base station, and use of the beam coherence interval metric by the base station to configure the UE beam measurement resource and reporting and triggers. The embodiments may provide improved performance over conventional methods.

In one aspect the present invention provides a method that includes determining, by a user equipment device (UE), a beam coherence interval metric. The beam coherence interval metric is a measure of stability of a beam pair over time based on a set of beam coherence intervals measured by the UE. The beam pair comprises a receive beam of the UE and a transmit beam of a base station transmitting to the UE. A beam coherence interval comprises a time duration within which a quality of a signal received on the UE receive beam remains within one of a plurality of signal quality bins. The method also includes determining, by the UE, a hysteresis value based on the beam coherence interval metric, and using, by the UE, the hysteresis value to decide to switch from an active receive beam to a different receive beam that has a signal quality higher than the active receive beam by at least the hysteresis value.

In another aspect the present invention provides a user equipment device (UE) that includes a phased array antenna panel for beamforming receive beams to receive transmissions from a base station and a processor. The processor is programmed to measure a set of beam coherence intervals. A beam coherence interval comprises a time duration within which a quality of a signal received on a receive beam of the UE remains within one of a plurality of signal quality bins. The processor is also programmed to determine a beam coherence interval metric based on the measured set of beam coherence intervals. The beam coherence interval metric is a measure of stability of a beam pair over time. The beam pair comprises a receive beam of the UE and a transmit beam of the base station. The processor is also programmed to determine a hysteresis value based on the beam coherence interval metric and use the hysteresis value to decide to switch from an active receive beam to a different receive beam that has a signal quality higher than the active receive beam by at least the hysteresis value.

In yet another aspect the present invention provides a base station that includes a phased array antenna panel for beamforming beams to send and receive transmissions with a user equipment device (UE) and a processor. The processor is programmed to receive a beam coherence interval metric from the UE. The beam coherence interval metric is a measure of stability of a beam pair over time based on a set of beam coherence intervals measured by the UE. The beam pair comprises a receive beam of the UE and a transmit beam of the base station. A beam coherence interval comprises a time duration within which a quality of a signal received on the UE receive beam remains within one of a plurality of signal quality bins. The processor is also programmed to send, to the UE, beam measurement resource and/or reporting configurations based on the received beam coherence interval metric.

DETAILED DESCRIPTION OF THE EMBODIMENTS

Figure 1:
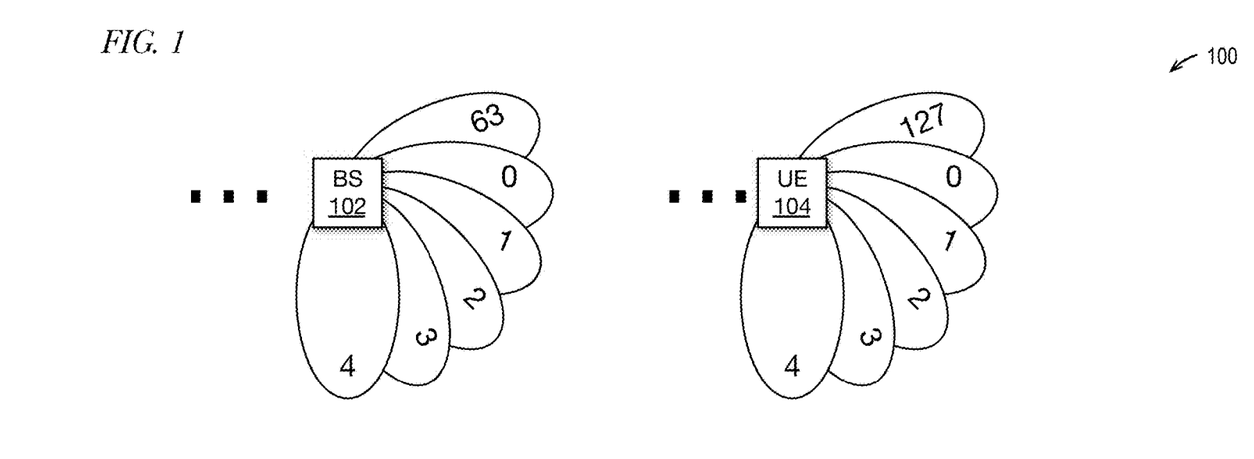
FIG. 1 is a block diagram illustrating an example of a cellular system having a base station (BS) and a user equipment device (UE) each capable of forming multiple beams in accordance with embodiments of the present disclosure.

FIG. 1 is a block diagram illustrating an example of a cellular system 100 having a base station (BS) 102 and a user equipment device (UE) 104 each capable of forming multiple beams in accordance with embodiments of the present disclosure. For ease of illustration, the UE has 128 beams indexed 0 through 127 (although the UE may have a different number of beams), and the BS has 64 beams indexed 0 through 63 (although the UE may have a different number of beams).

Within the protocol for New Radio (NR), there are synchronization signal blocks (SSBs) and channel state information reference signals (CSI-RS) that are transmitted by the base station on transmit beams for use in beam management. Each SSB and CSI-RS has an associated index. The UE may not know the indices of the base station transmit beams; instead, the UE may identify the base station transmit beams by the index of the SSB or CSI-RS that is transmitted upon the transmit beam and possibly by quasi co-location (QCL) information. The transmit beams upon which SSBs are transmitted are typically wide beams, and the transmit beams upon which CSI-RSs are transmitted are typically narrow beams. In NR, SSBs are "always on" to facilitate initial access as well as ongoing beam management and are transmitted in a burst referred to as an SSB burst set (e.g., with a default value during a window of up to almost 5 milliseconds, i.e., a half frame) with a periodicity of 20 milliseconds, although the default SSB burst periodicity may be changed by an upper layer message. CSI-RSs, on the other hand, are not always on like SSBs. Instead, the base station configures the UE with beam measurement resources to inform the UE when the CSI-RSs will be transmitted so that the UE can measure them. Additionally, the base station configures the UE for beam measurement reporting to instruct the UE when to report its measurement of the reference signals. The base station may configure the UE for periodic beam measurement and reporting, may trigger the UE for aperiodic beam measurement and recording, and/or may both configure the UE for semi-persistent periodic beam measurement and reporting that is triggered (activated) and untriggered (deactivated) by the base station.

The current mechanisms in NR may be inadequate for handling UE mobility in beamformed systems. For example, the UE may move through tremendous angular volume without the base station knowing because it has neither visibility to the mobility of the UE nor control over the UE receive beam. Therefore, embodiments of an efficient over-the-air (OTA) control system for managing UE receive beams through base station configuration of UE beam measurements and the reporting of a beam coherence interval metric from the UE to be used for more efficient scheduling and configuring of the UE.

Figure 2:
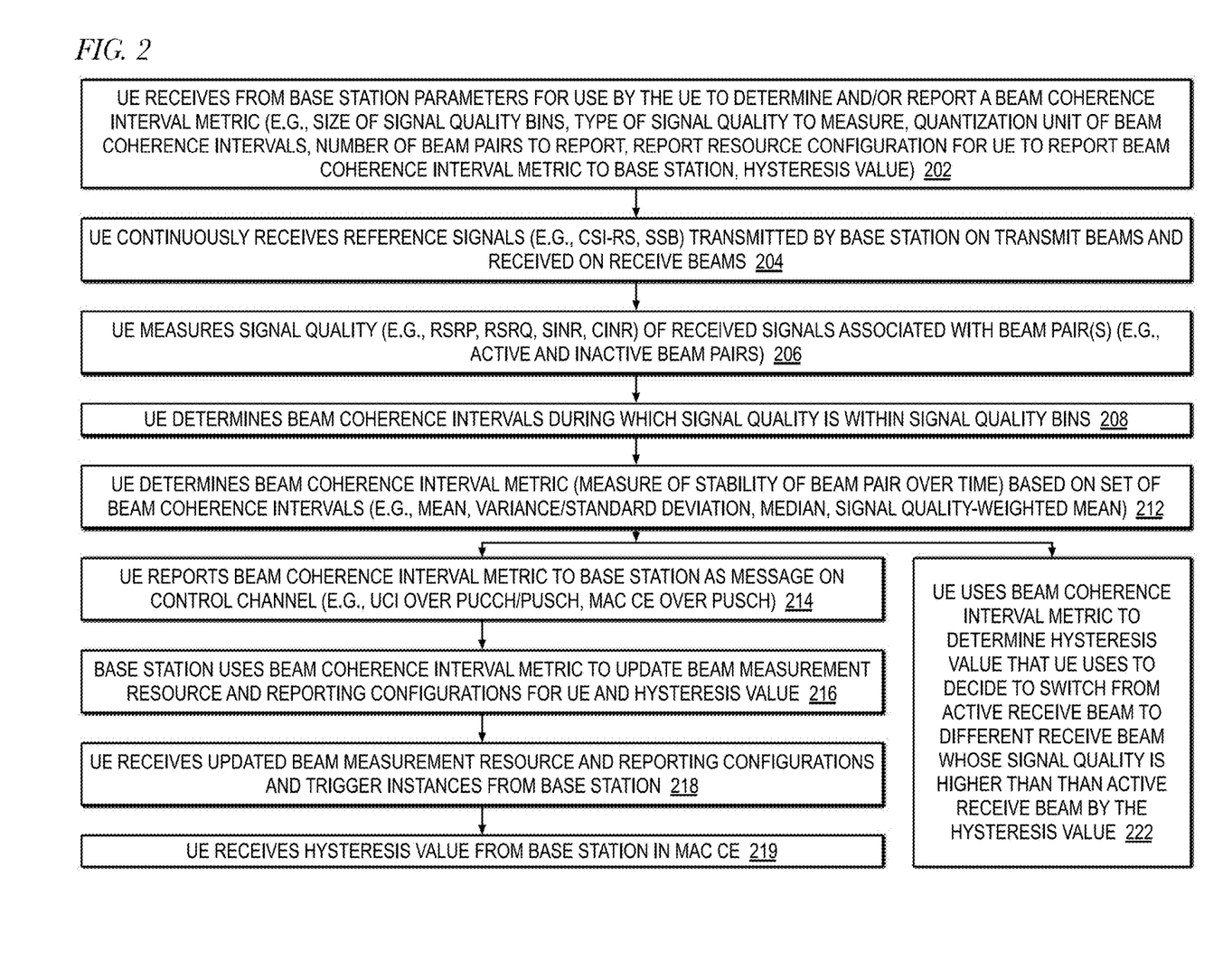
FIG. 2 is a flowchart illustrating an example of operation of the UE and base station in the determination and use of beam coherence interval metrics in accordance with embodiments of the present disclosure.

FIG. 2 is a flowchart illustrating an example of operation of the UE and base station in the determination and use of beam coherence interval metrics in accordance with embodiments of the present disclosure. Operation begins at block 202.

At block 202, the UE receives parameters from the base station that the UE may use to determine a beam coherence interval metric. In one embodiment, the base station sends the parameters to the UE in an information element (IE), which is defined in the NR specification. The parameters may include one or more of the following: a signal quality bin size (described in more detail with respect to block 208 and FIGS. 3 and 4), a signal quality measurement type (described with respect to block 206), a beam coherence interval quantization unit (described with respect to FIGS. 3 and 4), a number of beam pairs for which to report a beam coherence interval metric (described with respect to block 214, a report resource configuration that specifies resources for the UE to use to report beam coherence interval metrics to the base station, and a hysteresis value (described with respect to block 222). Each of these parameters is described in more detail below in conjunction with the determination of a beam coherence interval metric by the UE. In one embodiment, the UE assumes a default value if the base station does not provide one or more of the parameters to the UE. Operation proceeds to block 204.

At block 204, the base station continuously transmits reference signals on transmit beams and the UE receives the reference signals on receive beams. Hence, one or more transmit/receive beams pairs are utilized. Examples of the reference signals may include synchronization signal blocks (SSBs), channel state information reference signals (CSI-RS), or other reference signals that the UE may employ to measure signal quality. It should be understood that although the base station continuously transmits the reference signals, the reference signals may be transmitted in a periodic, semi-persistent, or aperiodic manner. Operation proceeds to block 206.

Figure 3:
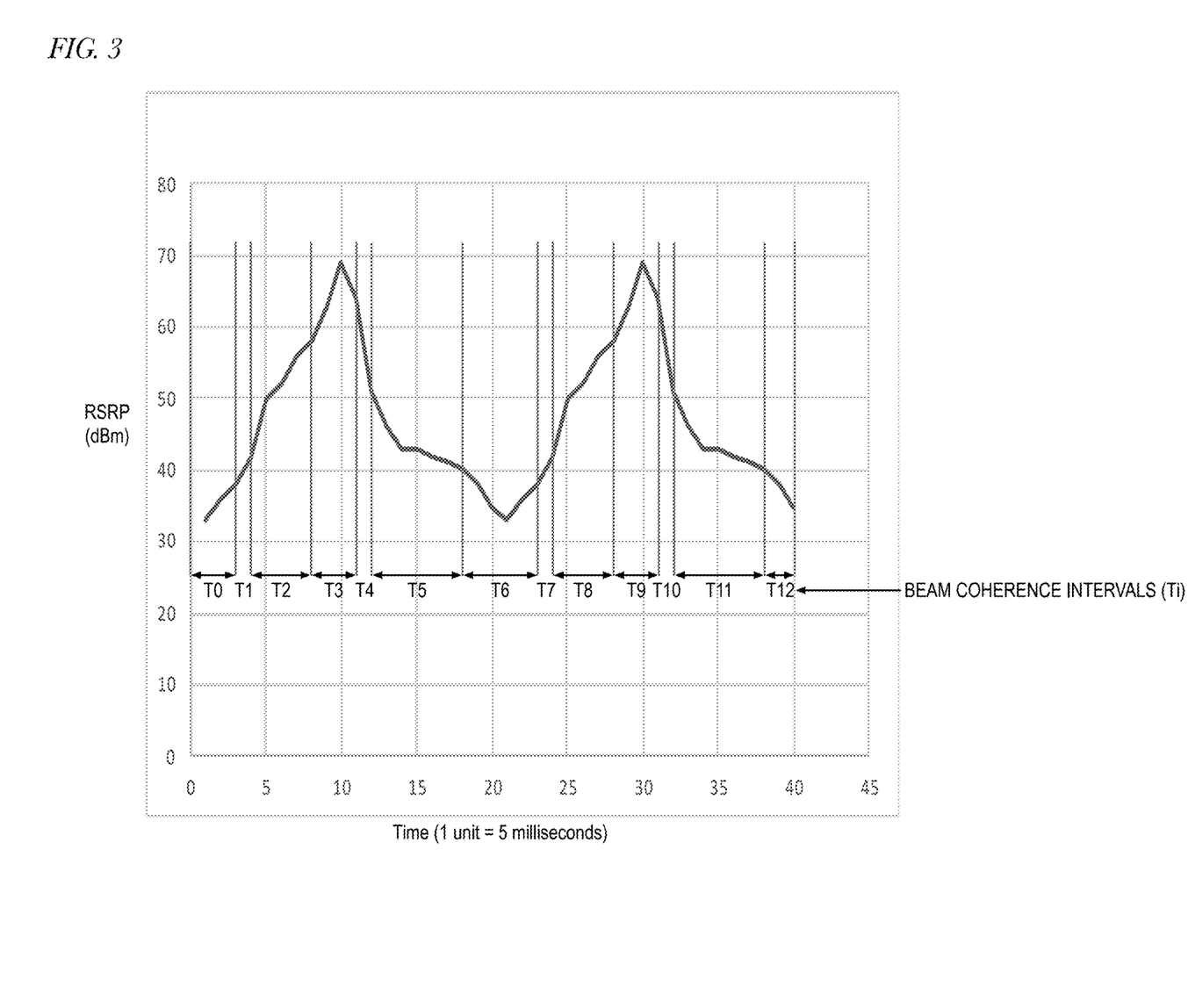
FIG. 3 is a graph illustrating measured reference signal quality (RSRP in dBm) over an interval of 200 milliseconds and illustrating beam coherence intervals.

At block 206, the UE measures the signal quality of the received reference signals. The signal quality may be one of different signal quality types, such as reference signal received power (RSRP), reference signal received quality (RSRQ), signal-to-interference-plus-noise ratio (SINR), carrier-to-interference-plus-noise ratio (CINR), or other signal quality types. Each signal quality measurement is associated with a beam pair. More specifically, the UE knows the receive beam of the beam pair it is using to receive the reference signal it is measuring. Additionally, the UE knows an index included in each of the reference signals, and the index is associated with a base station transmit beam. The beam pair may be an active beam pair or an inactive beam pair. An active beam pair is a base station transmit beam and a UE receive beam upon which the base station is actively transmitting data and/or control information and the UE is actively receiving it, e.g., upon a physical downlink shared channel (PDSCH) and/or physical downlink control channel (PDCCH). An active beam pair is distinguished from beam pairs, for example, upon which the base station is transmitting reference signals and the UE is receiving the reference signals for the purpose of beam management, e.g., SSBs, CSI-RS. It should be understood that an active beam pair may also be included in the list of beam pairs upon which the base station may transmit beam management reference signals and the UE may receive the beam management reference signals. FIG. 3 is a graph illustrating measured reference signal quality (RSRP in dBm) over an interval of 200 milliseconds, as described in more detail below. Operation proceeds to block 208.

Figure 4:
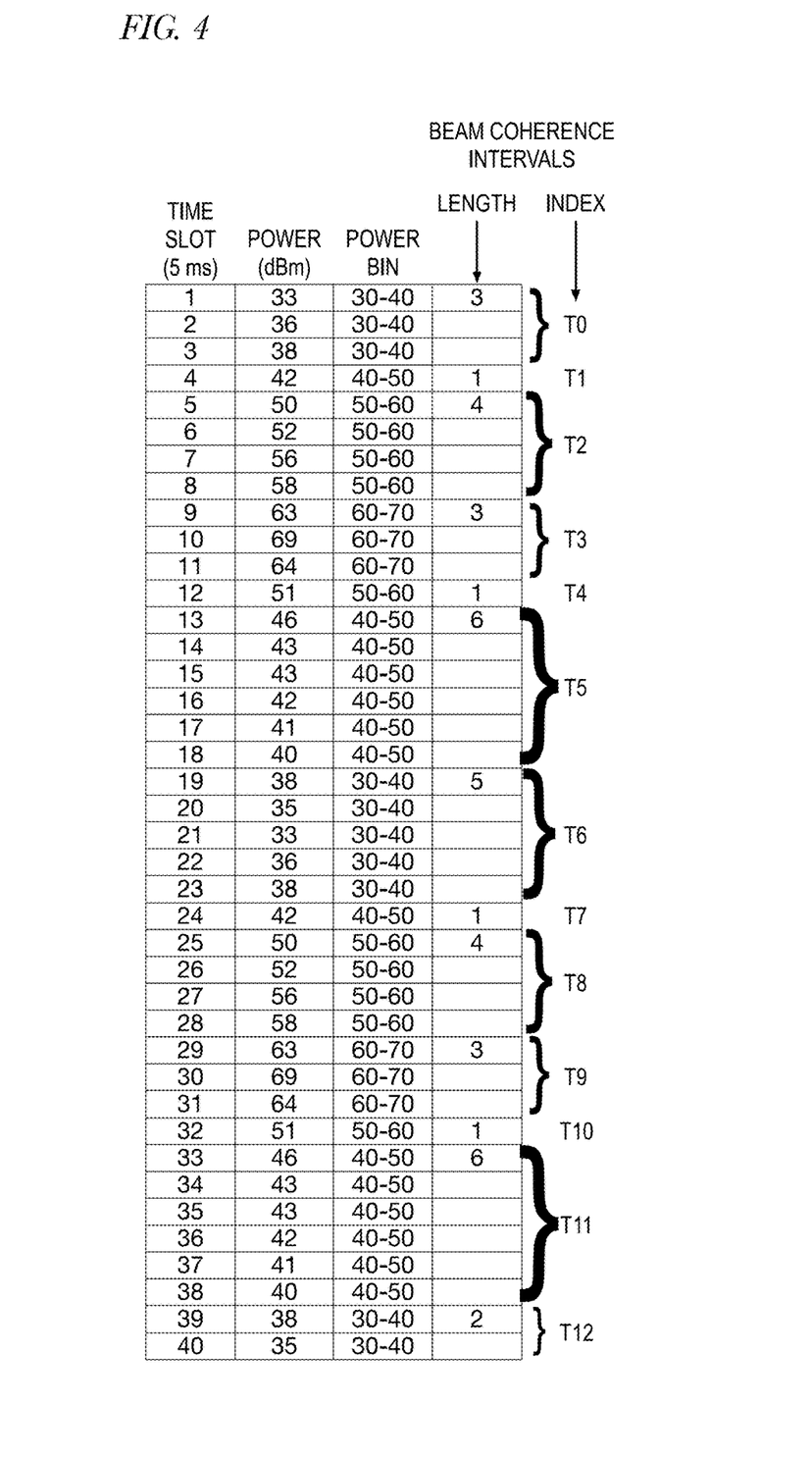
FIG. 4 is a table showing each of the time slots of FIG. 3, their power measurement value, the power bin within which they fall, and the length and index of each of the thirteen beam coherence intervals.
Figure 5:
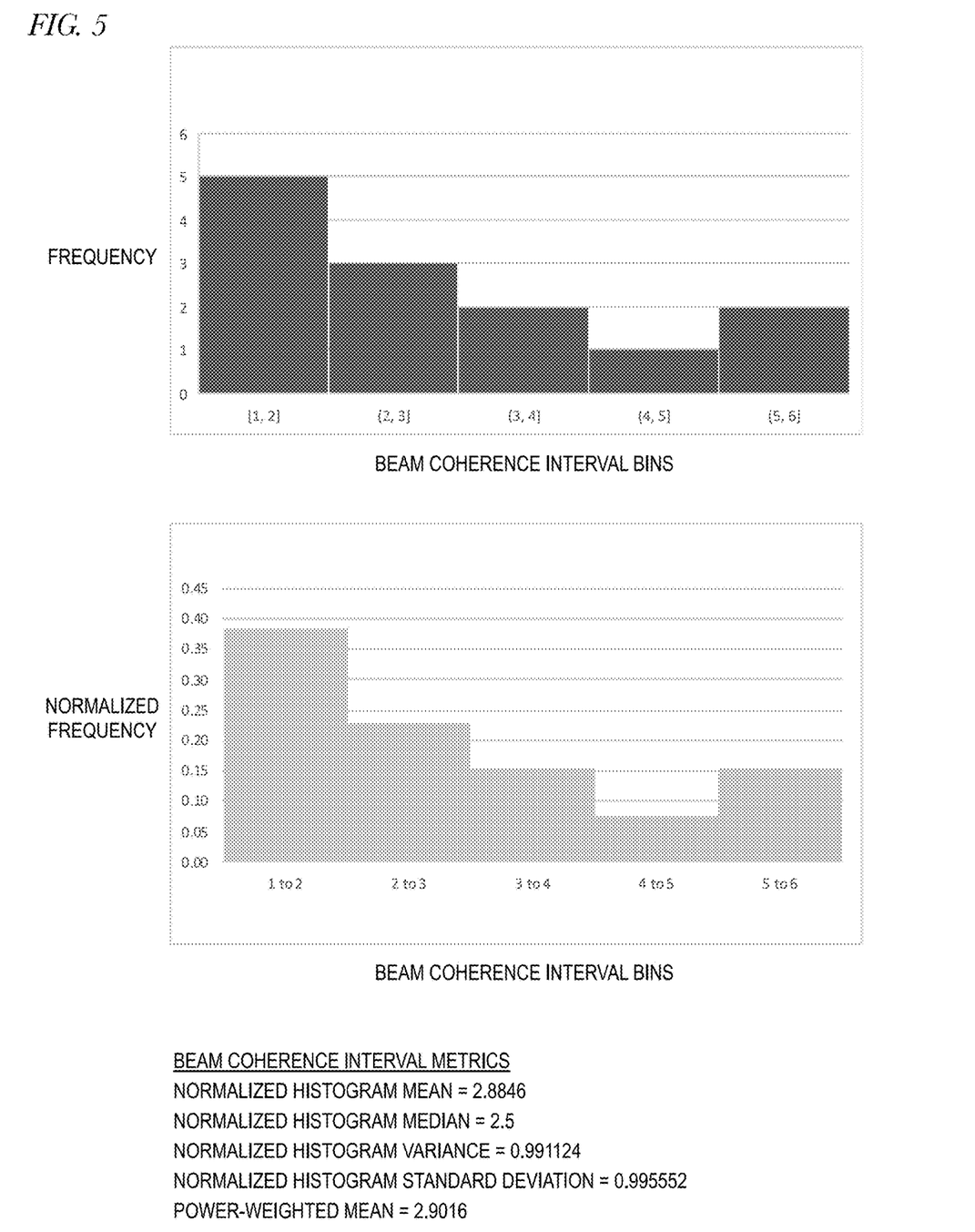
FIG. 5 is two example histograms constructed from the beam coherence intervals of FIGS. 3 and 4 and five embodiments of a beam coherence interval metric determined from the histograms.

At block 208, the UE determines beam coherence intervals during which the signal quality of the beam pair is within different signal quality bins. A signal quality bin is a range of measured signal quality, which, as noted above, may be measured in terms of signal power (e.g., RSRP), RSRQ, SINR, CINR, etc. The size, or width, of the signal quality bins may be specified in the IE received at block 202, as stated above. For example, if the IE specifies a signal quality type of RSRP and a signal quality bin size of 10 dBm, then each bin is 10 dBm wide, e.g., the bins may be from 0 to 10 dBm, 10 to 20 dBm, 20 to 30 dBm, and so forth. In one embodiment, the base station may also specify in the IE an offset for the bins. For example, the base station may specify an offset of 3 dBm that shifts the bins by that amount. If the base station does not specify a signal quality bin size and/or offset, default values may be used. Thus, a beam coherence interval is a length of time during which the signal quality of a beam pair is within the range of the same signal quality bin. For example, a beam pair may have a signal quality within a range of 20 to 30 dBm for 35 milliseconds; hence, a beam coherence interval of 35 milliseconds. An example of signal quality bins and beam coherence intervals may be seen in the example of FIG. 3 in which the signal quality bin size is 10 dBm. In FIG. 3, each unit along the time (horizontal) axis corresponds to 5 milliseconds. In the example of FIG. 3, this value corresponds to a beam coherence interval quantization unit, which is the unit of time at which the signal quality of a beam pair is examined to determine which signal quality bin the signal quality falls into. Consequently, the beam coherence interval quantization unit is also the width in time of the bins in the time axis of subsequently constructed histograms, such as the histograms of FIG. 5 described in more detail below. In one embodiment, the base station may provide the UE a value of the beam coherence interval quantization unit (e.g., per block 202), and the UE may assume a default value if the base station does not provide one to the UE. Eight signal quality bins are shown: 0 to 10 dBm, 10 to 20 dBm, and so forth to 70 to 80 dBm. In the example of FIG. 3, thirteen beam coherence intervals are determined, denoted T0 through T12. FIG. 4 is a table showing each of the 40 time slots of 5 milliseconds each, their RSRP measurement value in dBm, the power bin within which they fall, and the length and index (Ti) of each of the thirteen beam coherence intervals. It should be understood that the values provided in FIGS. 3 through 5 are provided for illustration purposes and are not intended to convey experimentally determined values. Operation proceeds to block 212.

At block 212, the UE determines a beam coherence interval metric using the set of beam coherence intervals measured at block 208. The beam coherence interval metric is a measure of the stability of a beam pair over time. In one embodiment, the UE constructs a histogram of the beam coherence intervals measured at block 208. FIG. 5 illustrates two example histograms. The histogram in the upper portion of FIG. 5 is constructed with horizontal bins each representing different ranges of beam coherence interval quantization units. The example histogram of FIG. 5 includes five beam coherence interval bins, namely [1,2], (2,3], (3,4], (4,5], and (5,6]. Taken from the data in the table of FIG. 4, the frequency of bin [1,2] is 5, the frequency of bin (2,3] is 3, the frequency of bin (3,4] is 2, the frequency of bin (4,5] is 1, and the frequency of bin (5,6] is 2. The histogram in the lower portion of FIG. 5 is a normalized version of the upper histogram. That is, the frequency values are normalized based on the total number of beam coherence intervals, which is 13 in the example. In one embodiment, the beam coherence interval metric is the mean of the normalized histogram, which is 2.8846 for the example of FIG. 5. In one embodiment, the beam coherence interval metric is the variance of the histogram, which is 0.991124 for the example of FIG. 5. In one embodiment, the beam coherence interval metric is the median of the histogram, which is 2.5 for the example of FIG. 5. In one embodiment, the beam coherence interval metric is the standard deviation of the histogram, which is 0.995552 for the example of FIG. 5. In one embodiment, the beam coherence interval metric is the weighted mean of the beam coherence intervals in which the weight of each beam coherence interval is its corresponding signal quality value (e.g., RSRP), which is 29016 for the example of FIG. 5. As an example, the weight of beam coherence interval T2 is 55 (the middle value of the range of 50 to 60 dBm). Additionally, if beam correspondence holds at the UE, the computed and reported beam coherence interval metric on the downlink may also be assumed to be valid for the uplink beam pair (i.e., UE transmit beam and base station receive beam) and used accordingly. Operation proceeds to block 214 and, or alternatively, to block 222.

At block 214, the UE reports the beam coherence interval metric determined at block 212 over the air to the base station. In one embodiment, the UE sends the beam coherence interval metric in a message on a control channel. In one embodiment, the UE transmits the beam coherence interval metric as uplink control information (UCI) over a short physical uplink control channel (PUCCH). In one embodiment, the UE transmits the beam coherence interval metric as UCI over a long PUCCH. In one embodiment, the UE transmits the beam coherence interval metric as UCI over a physical uplink shared channel (PUSCH). In one embodiment, the UE transmits the beam coherence interval metric via a media access control (MAC) control element (CE) over a PUSCH. These are example embodiments, and other embodiments are contemplated in which the UE sends the beam coherence interval metric as a message on a control channel. Operation proceeds to block 216.

At block 216, the base station uses the beam coherence interval metric to update beam measurement resource and reporting configurations for the UE and configures the UE accordingly. In the case of periodic beam measurement, the base station may update the measurement reporting interval. In the case of aperiodic beam measurement, the base station may update how often or when reporting is triggered. Generally speaking, the base station may configure the UE to measure and report beam management reference signals more frequently inversely proportionally to the size of the beam coherence interval metric. That is, when the beam coherence interval metric is relatively large (i.e., the beam pair is relatively stable), the base station will configure the UE to measure and report relatively less frequently; whereas, when the beam coherence interval metric is relatively small (i.e., the beam pair is relatively unstable), the base station will configure the UE to measure and report relatively more frequently. Additionally, the base station may use the beam coherence interval metric to determine when to send the UE semi-persistent and/or aperiodic beam measurement and report trigger instances. Finally, the base station may update the hysteresis value (described in more detail with respect to block 222 below) based on the beam coherence interval metric. Operation proceeds to block 218.

At block 218, the UE receives from the base station the updated beam measurement resource and reporting configurations updated at block 216. Additionally, the UE may receive trigger instances from the base station that are determined based on the beam coherence interval metric. Preferably, the base station and UE repeatedly perform the operations of blocks 204 through 218. In this manner, by transmitting the beam coherence interval metric over the air the, the base station and UE are in a closed loop active control system to perform beam management. The active control loop as described, incorporating beam coherence interval metric determination by the UE (optionally according to parameters provided by the base station), provision of the beam coherence interval metric to the base station, and use of the beam coherence interval metric by the base station to configure the UE beam measurement resource and reporting and triggers, may provide improved performance over conventional NR methods, such as the base station relying upon beam correspondence in the uplink and the downlink. More specifically, in instances when the beam pairs are relatively stable, the beam coherence interval metric-based active control loop may reduce the overhead associated with beam management in both the downlink and uplink by reducing the frequency of beam management-related reference signal transmission, measurement and reporting, while in instances of relative beam pair instability the frequency of beam management-related reference signal transmission, measurement and reporting may be increased which may reduce the likelihood of link failure and increase the likelihood that control and data will be transmitted at higher data rates as a result of the use of better beam pairs with higher antenna gain. Operation proceeds to block 219.

At block 219, the UE receives from the base station the updated hysteresis value updated at block 216. In one embodiment, the base station sends the updated hysteresis value via a MAC CE over a PDSCH.

At block 222, in an alternative or additional operation to the operations at block 214 through block 218, the UE uses the beam coherence interval metric directly. In one embodiment, the UE uses the beam coherence interval metric to determine a hysteresis value. The UE uses the hysteresis value to decide when to switch from its active receive beam to a different receive beam. More specifically, if the signal quality of another receive beam rises above the signal quality of the active receive beam by more than the hysteresis value, then the UE may switch to the other receive beam as the active receive beam. Thus, the hysteresis value may be used to achieve a target beam switching rate. Generally speaking, the larger the hysteresis value, the less frequently the UE will switch its active receive beam and the greater the loss of antenna gain that might have been achieved by switching to a better receive beam. Generally, the shorter the beam coherence interval metric, the larger the desired hysteresis value. That is, the UE will generally compute the hysteresis value substantially inversely proportional to the beam coherence interval metric. Similarly, when the base station determines a hysteresis value to send to the UE, the base station will generally compute the hysteresis value substantially inversely proportional to the beam coherence interval metric. In one embodiment, the base station sends the UE an index to a table of hysteresis values to indicate which hysteresis value to use.

Figure 6:
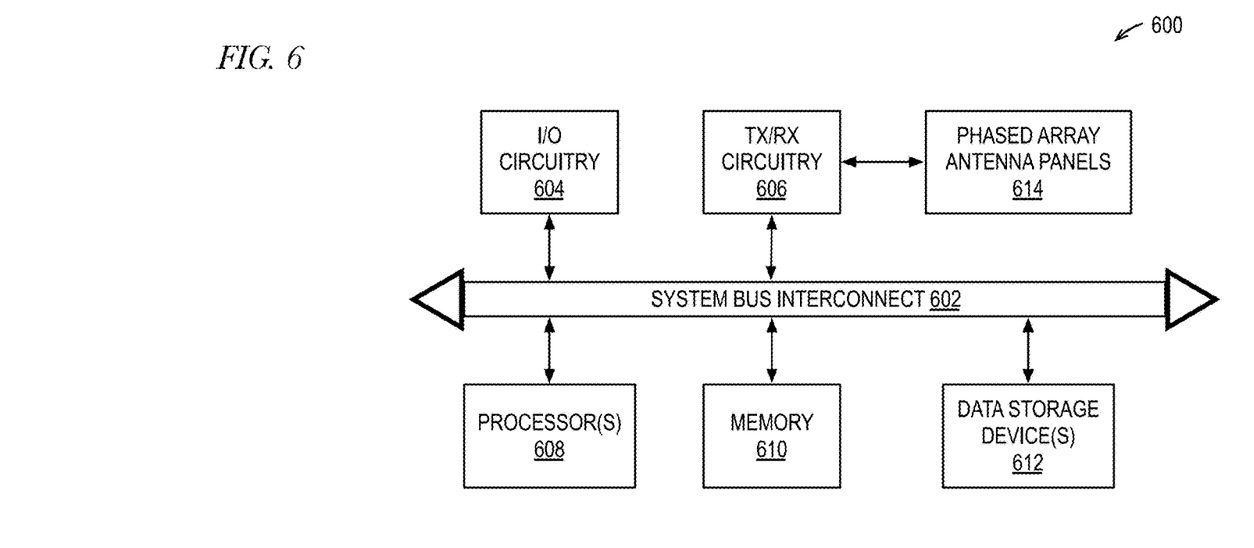
FIG. 6 is a block diagram of an example embodiment for electronic components that can be used to implement a user equipment (UE) including the functions and operational features described for the disclosed embodiments.

FIG. 6 is a block diagram of an example embodiment 600 for electronic components that can be used to implement a user equipment (UE) including the functions and operational features described for the disclosed embodiments. For the example embodiment 600 shown in FIG. 6, one or more processors 608 communicate with other components through system bus interconnect 602. For example, the one or more processors 608 communicate with input/output (I/O) circuitry 604 and transmit/receive (TX/RX) circuitry 606 through the system bus interconnect 602. Additional circuitry can also be included such as power supply circuitry and/or other desired circuitry. The TX/RX circuitry 606 provides one or more cellular radios that are coupled to one or more phased array antenna panels 614 through which the TX/RX circuitry transmits and receives RF (radio frequency) signals (e.g., from a few kHz to 10 GHz and above). The phased array antenna panels 614 may be controlled by the processors 608 and/or the TX/RX circuitry 606 to perform baseband and/or analog beamforming of transmit and receive beams according to embodiments described herein to accomplish beam coherence interval metric determination, transmission and use thereof. The I/O circuitry 604 provides one or more interfaces for users, such as graphical user interfaces, and/or connections to peripheral devices (e.g., displays, keyboards, mice, point device, and/or other I/O peripheral devices). The memory 610 is also coupled to the system bus interconnect 602 and can be used by the one or more processors 608 to load and/or store instructions, data, and/or other information during operation, such as operations described with respect to FIG. 2 and the other Figures to accomplish beam coherence interval metric determination, transmission and use thereof. One or more data storage device(s) 612 are also connected to the system bus interconnect 602 and can store software or program instructions and/or other desired data or information for the operation of the processing system. For example, computer-readable instructions stored in the data storage devices 612 can be loaded within the memory 610 and then executed by the processor(s) 608 to carry out the described functions to accomplish beam coherence interval metric determination, transmission and use thereof.

It is noted that different and/or additional components from those depicted in FIG. 6 could also be used to implement one or more radio systems for the described embodiments while still taking advantage of the described techniques. It is further noted that the system bus interconnect 602 can be implemented as multiple interconnection buses with or without additional intervening circuitry such as routing or switching circuitry. Further, the processor(s) 608 can be implemented using one or more programmable integrated circuits including controllers, microcontrollers, microprocessors, hardware accelerators, configurable logic devices (e.g., field programmable gate arrays), and/or other programmable integrated circuits that are programmed to carry out the described functions. Further, the one or more processor(s) 608 can execute instructions stored in a non-transitory tangible computer-readable medium to perform the described functions. In addition, data storage device(s) 612 can be implemented as any desired non-transitory tangible medium that stores data, such as data storage devices, FLASH memory, random access memory, read only memory, programmable memory devices, reprogrammable storage devices, hard drives, floppy disks, DVDs, CD-ROMs, and/or any other non-transitory data storage mediums. The memory 610 can be any data storage medium configured to maintain data storage when powered. Other variations could may be implemented.

It is still further noted that the functional blocks, components, systems, devices, and/or circuitry described herein can be implemented using hardware, software, or a combination of hardware and software. For example, the disclosed embodiments can be implemented using one or more programmable integrated circuits that are programmed to perform the functions, tasks, methods, actions, and/or other operational features described herein for the disclosed embodiments. The one or more programmable integrated circuits can include, for example, one or more processors and/or PLDs (programmable logic devices). The one or more processors can be, for example, one or more central processing units (CPUs), controllers, microcontrollers, microprocessors, hardware accelerators, ASICs (application specific integrated circuit), and/or other integrated processing devices. The one or more PLDs can be, for example, one or more CPLDs (complex programmable logic devices), FPGAs (field programmable gate arrays), PLAs (programmable logic array), reconfigurable logic circuits, and/or other integrated logic devices. Further, the programmable integrated circuits, including the one or more processors, can be configured to execute software, firmware, code, and/or other program instructions that are embodied in one or more non-transitory tangible computer-readable mediums to perform the functions, tasks, methods, actions, and/or other operational features described herein for the disclosed embodiments. The programmable integrated circuits, including the one or more PLDs, can also be programmed using logic code, logic definitions, hardware description languages, configuration files, and/or other logic instructions that are embodied in one or more non-transitory tangible computer-readable mediums to perform the functions, tasks, methods, actions, and/or other operational features described herein for the disclosed embodiments. In addition, the one or more non-transitory tangible computer-readable mediums can include, for example, one or more data storage devices, memory devices, flash memories, random access memories, read only memories, programmable memory devices, reprogrammable storage devices, hard drives, floppy disks, DVDs, CD-ROMs, and/or any other non-transitory tangible computer-readable mediums. Other variations can also be implemented while still taking advantage of the new frame structures described herein.

Further modifications and alternative embodiments will be apparent to those skilled in the art in view of this description. It will be recognized, therefore, that the present invention is not limited by these example arrangements. Accordingly, this description is to be construed as illustrative only and is for teaching those skilled in the art the manner of carrying out the invention. It is to be understood that the forms of the invention herein shown and described are to be taken as present embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

The invention claimed is:

1. A method, comprising:
    determining, by a user equipment device (UE), a beam coherence interval metric;
    wherein the beam coherence interval metric is a measure of stability of a beam pair over time based on a set of beam coherence intervals measured by the UE, wherein the beam pair comprises a receive beam of the UE and a transmit beam of a base station transmitting to the UE;
    wherein a beam coherence interval comprises a time duration within which a quality of a signal received on the UE receive beam remains within one of a plurality of signal quality bins;
    determining, by the UE, a hysteresis value based on the beam coherence interval metric;
    using, by the UE, the hysteresis value to decide to switch from an active receive beam to a different receive beam that has a signal quality higher than the active receive beam by at least the hysteresis value; and
    receiving, by the UE from the base station, prior to said determining the beam coherence interval metric, an information element (IE) to configure the UE with parameters used by the UE to determine and/or report the beam coherence interval metric;
    wherein the IE includes a report resource configuration that specifies a PUCCH resource index, periodicity and offset of a reporting interval with which the UE reports beam coherence interval metrics to the base station.

2. The method of claim 1,
    wherein the plurality of signal quality bins comprises a plurality of different ranges of signal quality values, wherein the plurality of signal quality bins comprises at least three different signal quality bins.

3. The method of claim 1,
    wherein the beam coherence interval metric comprises a statistic of a histogram of the beam coherence intervals; and
    wherein the statistic is one or more of:
       mean;
       variance;
       median;
       standard deviation.

4. The method of claim 1,
    wherein the beam coherence interval metric comprises a weighted mean of a histogram of the beam coherence intervals; and
    wherein weights of the weighted mean comprise levels of the plurality of signal quality bins.

5. The method of claim 1,
    wherein the IE includes a size of the signal quality bins.

6. The method of claim 1,
    wherein the IE includes an indication of a type of the signal quality to measure.

7. The method of claim 1,
    wherein the IE includes a quantization unit of the beam coherence intervals.

8. The method of claim 1,
    wherein the IE includes an indication of a number of beam pairs for which the UE may report a beam coherence interval metric.

9. A user equipment device (UE), comprising:
    a phased array antenna panel for beamforming receive beams to receive transmissions from a base station;
    a processor programmed to:
       measure a set of beam coherence intervals, wherein a beam coherence interval comprises a time duration within which a quality of a signal received on a receive beam of the UE remains within one of a plurality of signal quality bins;
       determine a beam coherence interval metric based on the measured set of beam coherence intervals, wherein the beam coherence interval metric is a measure of stability of a beam pair over time, wherein the beam pair comprises a receive beam of the UE and a transmit beam of the base station;
       determine a hysteresis value based on the beam coherence interval metric;
       use the hysteresis value to decide to switch from an active receive beam to a different receive beam that has a signal quality higher than the active receive beam by at least the hysteresis value; and
       receive, by the UE from the base station, prior to said determining the beam coherence interval metric, an information element (IE) to configure the UE with parameters used by the UE to determine and/or report the beam coherence interval metric;
    wherein the IE includes a report resource configuration that specifies a PUCCH resource index, periodicity and offset of a reporting interval with which the UE reports beam coherence interval metrics to the base station.

10. The UE of claim 9,
    wherein the plurality of signal quality bins comprises a plurality of different ranges of signal quality values, wherein the plurality of signal quality bins comprises at least three different signal quality bins.

11. The UE of claim 9,
wherein the beam coherence interval metric comprises a statistic of a histogram of the beam coherence intervals; and
wherein the statistic is one or more of:
  mean;
  variance;
  median;
  standard deviation.

12. The UE of claim 9,
wherein the beam coherence interval metric comprises a weighted mean of a histogram of the beam coherence intervals; and
wherein weights of the weighted mean comprise levels of the plurality of signal quality bins.

13. The UE of claim 9,
wherein the IE includes a size of the signal quality bins.

14. The UE of claim 9,
wherein the IE includes an indication of a type of the signal quality to measure.

15. The UE of claim 9,
wherein the IE includes a quantization unit of the beam coherence intervals.

16. The UE of claim 9,
wherein the IE includes an indication of a number of beam pairs for which the UE may report a beam coherence interval metric.

17. A base station, comprising:
a phased array antenna panel for beamforming beams to send and receive transmissions with a user equipment device (UE);
a processor programmed to:
  receive a beam coherence interval metric from the UE;
  wherein the beam coherence interval metric is a measure of stability of a beam pair over time based on a set of beam coherence intervals measured by the UE, wherein the beam pair comprises a receive beam of the UE and a transmit beam of the base station; and
  wherein a beam coherence interval comprises a time duration within which a quality of a signal received on the UE receive beam remains within one of a plurality of signal quality bins;
  send, to the UE, beam measurement resource and/or reporting configurations based on the received beam coherence interval metric; and
  send, to the UE prior to receiving the beam coherence interval metric from the UE, an information element (IE) to configure the UE with parameters used by the UE to determine and/or report the beam coherence interval metric, wherein the IE includes a report resource configuration that specifies a PUCCH resource index, periodicity and offset of a reporting interval with which the UE reports beam coherence interval metrics to the base station;
wherein the UE is configured to determine a hysteresis value based on the beam coherence interval metric and to use the hysteresis value to decide to switch from an active receive beam to a different receive beam that has a signal quality higher than the active receive beam by at least the hysteresis value.

18. The base station of claim 17,
wherein the plurality of signal quality bins comprises a plurality of different ranges of signal quality values, wherein the plurality of signal quality bins comprises at least three different signal quality bins.

19. The base station of claim 17,
wherein the beam coherence interval metric comprises a statistic of a histogram of the beam coherence intervals; and
wherein the statistic is one or more of:
  mean;
  variance;
  median;
  standard deviation.

20. The base station of claim 17,
wherein the beam coherence interval metric comprises a weighted mean of a histogram of the beam coherence intervals; and
wherein weights of the weighted mean comprise levels of the plurality of signal quality bins.

21. The base station of claim 17,
wherein the IE includes a size of the signal quality bins.

22. The base station of claim 17,
wherein the IE includes an indication of a type of the signal quality to measure.

23. The base station of claim 17,
wherein the IE includes a quantization unit of the beam coherence intervals.

24. The base station of claim 17,
wherein the IE includes an indication of a number of beam pairs for which the UE may report a beam coherence interval metric.

* * * * *